United States Patent
Harel

(10) Patent No.: US 10,948,217 B2
(45) Date of Patent: Mar. 16, 2021

(54) WATER SUPPLY AND HEATING SYSTEM WITH FLEXIBLE TANK AND HEATING CARPET

(71) Applicant: Alex Harel, Savion (IL)

(72) Inventor: Alex Harel, Savion (IL)

( * ) Notice: Subject to any disclaimer, the term of this patent is extended or adjusted under 35 U.S.C. 154(b) by 303 days.

(21) Appl. No.: 16/027,013

(22) Filed: Jul. 3, 2018

(65) Prior Publication Data

US 2018/0347853 A1 Dec. 6, 2018

Related U.S. Application Data

(63) Continuation-in-part of application No. 14/758,478, filed as application No. PCT/IL2014/000003 on Jan. 7, 2014, now abandoned.

(30) Foreign Application Priority Data

Jan. 8, 2013 (IL) .......................................... 224132

(51) Int. Cl.
| | | |
|---|---|---|
| *A61F 7/08* | (2006.01) | |
| *H05B 3/78* | (2006.01) | |
| *F24H 1/06* | (2006.01) | |
| *B65D 88/74* | (2006.01) | |
| *B65D 88/16* | (2006.01) | |
| *F24H 1/08* | (2006.01) | |
| *H05B 3/22* | (2006.01) | |
| *F24H 1/18* | (2006.01) | |
| *H05B 3/42* | (2006.01) | |

(Continued)

(52) U.S. Cl.
CPC ........... *F24H 1/06* (2013.01); *B65D 88/1606* (2013.01); *B65D 88/744* (2013.01); *F24H 1/08* (2013.01); *F24H 1/185* (2013.01); *H05B 3/22* (2013.01); *H05B 3/42* (2013.01); *H05B 3/78* (2013.01); *F24S 20/80* (2018.05); *F24S 60/30* (2018.05); *F24S 2080/01* (2018.05); *H05B 2214/02* (2013.01)

(58) Field of Classification Search
CPC ... F24H 1/06; F24H 1/08; F24H 1/121; F24H 1/162; F24H 1/182; F24H 1/183; F24H 1/185; F24H 1/188; B65D 88/16; B65D 88/1606; B65D 88/744; F24S 60/30; F24S 2080/01; F24S 20/80; H05B 3/22; H05B 3/42; H05B 3/36; H05B 3/46; H05B 3/56; H05B 3/565; H05B 3/78; H05B 2214/02
USPC ....... 392/443, 444, 447, 448, 453, 455, 458, 392/472
See application file for complete search history.

(56) References Cited

U.S. PATENT DOCUMENTS

| | | | |
|---|---|---|---|
| 5,522,523 A * | 6/1996 | Nogles ................... | F24H 1/183 392/455 |
| 2003/0210902 A1 * | 11/2003 | Giamati ................. | H05B 3/565 392/444 |

* cited by examiner

*Primary Examiner* — Hung D Nguyen

(57) ABSTRACT

A water supply and heating system that includes a flexible water tank, a flexible heating carpet and an electrical connection mechanism. The water tank includes a flexible outer layer and separable inflatable and collapsible water bag. The water bag is equipped with a water inlet and outlet hoses for receiving supplying water. The water bag is positioned inside the outer layer and is designed to remain collapsed when and to inflate when filled with water. The outer layer too is designed to inflate when the water bag is filled with the water and to deflate when the water is drained from the water bag. A dry space is defined between the outer layer and the water bag in which the heating carpet is positioned. The heating carpet includes flexible flat electrical heating strips that are connected to the electrical connection mechanism.

1 Claim, 4 Drawing Sheets

(51) Int. Cl.
*F24S 60/30* (2018.01)
*F24S 80/00* (2018.01)
*F24S 20/80* (2018.01)

WATER SUPPLY AND HEATING SYSTEM WITH FLEXIBLE TANK AND HEATING CARPET

RELATED APPLICATIONS

This application is a continuation in part of U.S. patent application Ser. No. 14/758,478 filed on Jun. 29, 2015, which is a National Phase of PCT Patent Application No. PCT/IL2014/000003 having International filing date of 7 Jan. 2014, which claims the benefit of priority from IL Patent Application No. 224132 filed on 8 Jan. 2013. The contents of the above applications are all incorporated by reference as if fully set forth herein in their entirety.

TECHNICAL FIELD

The present invention refers to a system for the supply and heating of water, which comprises a flexible water tank and a flexible heating carpet and electrical connection mechanism.

BACKGROUND ART

In many instances it is customary to use systems for the supply and heating of water for residential, industrial, and agricultural use. Currently existing systems are cumbersome and are based primarily on rigid, heavy water tanks that are inconvenient to transport and set up in the desire location. In many cases, users need a water supply and heating system that is portable and lightweight, and easy to connect and operate. The present invention describes a water supply and heating system with unique and innovative features that provides a response to these problems.

DESCRIPTION OF THE DRAWINGS

The intention of the drawings attached to the application is not to limit the scope of the invention and its application.

The drawings are intended only to illustrate the invention and they constitute only one of its many possible implementations.

THE INVENTION

Figure 1:
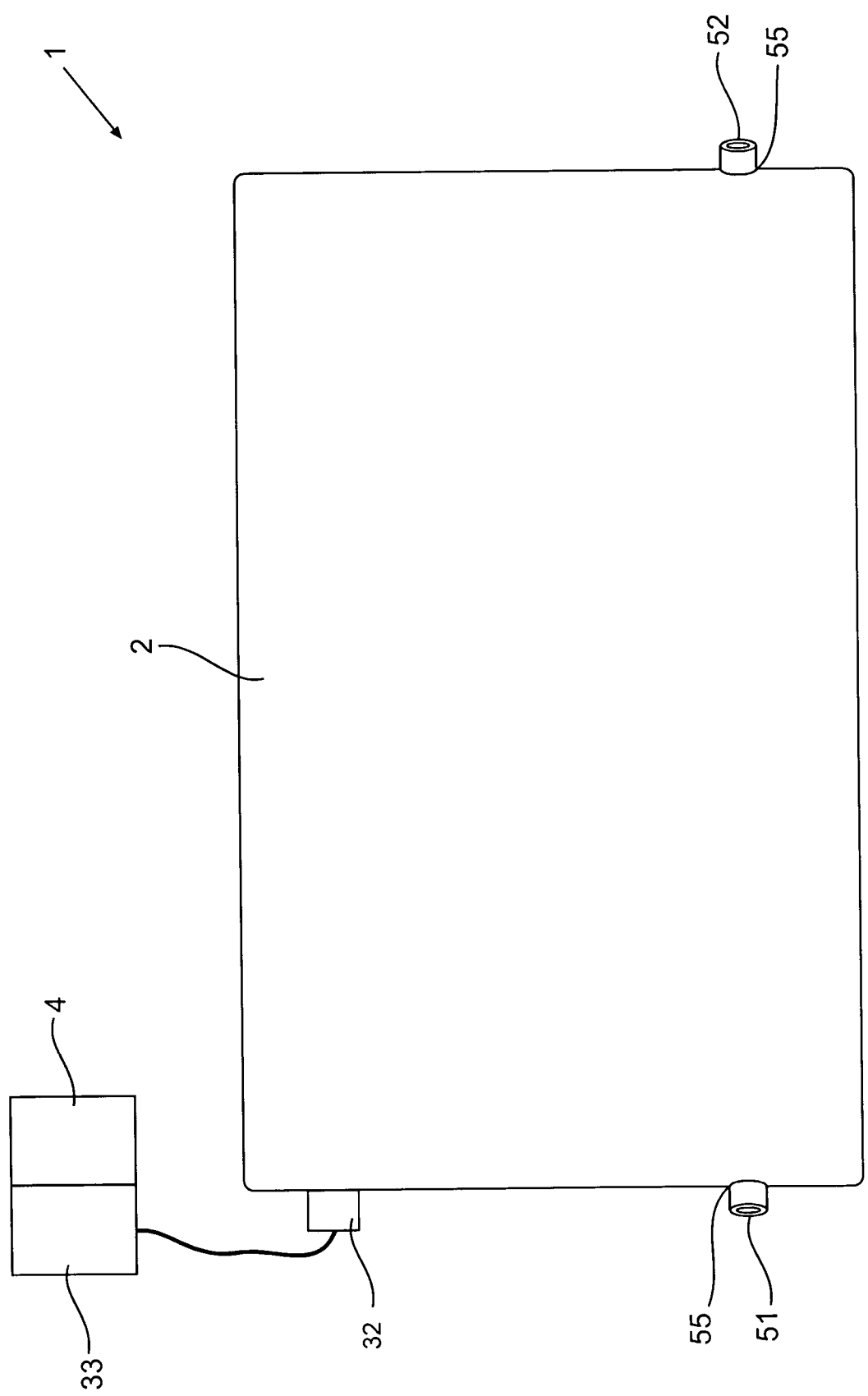
FIG. 1 presents schematically the system (1), the flexible water tank (2), the water inlet hose (51), the water outlet hose (52), the electrical connection mechanism (32), the controller (33) and a power supply (4).

The object of the present invention is to provide a water supply system (1) that comprises a flexible water tank (2), a flexible heating carpet (3) and an electrical connection mechanism (32).

The flexible water tank (2) comprises a flexible outer layer (21) and separable inflatable and collapsible water bag (22). The flexible water tank (2) may also include an insulating layer (23).

The separable inflatable and collapsible water bag (22) is equipped with a water inlet hose (51) and a water outlet hose (52). The water bag (22) is designed to receive water through the water inlet hose (51) and to supply water through the water outlet hose (52).

The water bag (22) is positioned inside the flexible outer layer (21) and is designed to remain collapsed when empty of water. The water inlet hose (51) and the water outlet hose (52) are accessible through an opening (55) in the flexible outer layer (21). The water bag (22) can be replaced by a new one in maintenance or before storage after use.

The water bag (22) is designed to inflate when filled with water while positioned in the flexible outer layer (21) and to deflate when the water is drained from the water bag (22). In the same way, the flexible outer layer (21) is designed to inflate when the water bag is filled with water while positioned inside the flexible outer layer (21) and to deflate when the water is drained from the water bag (22).

A dry space (7), like a gap even very small, is defined between the flexible outer layer (21) and the water bag (22). The flexible heating carpet (3) includes flexible flat electrical heating strips (31) that are connected to the electrical connection mechanism (32). The flexible heating carpet (3) is positioned in the dry space (7) between the flexible outer layer (21) and the water bag (22). By that, the flexible heating carpet that includes the flexible flat electrical heating strips (31) is positioned in a dry space and they have no contact with water. The electrical connection mechanism (32) is designed to connect the flexible flat electrical heating strips (31) to a power source supply (4).

The flexible heating carpet, due to its flexibility and the flexibility of the flexible flat electrical heating strips can receive the rounded shape of the flexible water tank (2) when filled by water or the flat shape when empty.

The system (1) is connected to a power source (4) that can be for example photo-voltaic panel. The system can be conveniently transported and set up at the relevant site and easily connected to existing water system. The system (1) may include a controller (33) that may include thermometer.

The outer layer (21) is preferably made of materials such as PVC, PE or other materials that are flexible enough to enable the tank (2) to inflate when it is filled with water and deflate when the water is drained out from it. The material must also be strong enough so that the outer layer does not tear under the weight of the water or upon contact or impact with other objects or with the ground when the system (1) is in use or is being transported to its required location. The separable inflatable and collapsible water bag (22) may be made of a food-safe material, i.e. a material approved by the relevant authorities for storing portable drinking water. The insulating layer (23) can be made of any known and existing insulating material.

The flexible heating carpet (3) is designed to heat the water in the water bag (22) using flexible electrical heating strips (31) that may be attached to the water bag (22) in such a way that leads to high energy efficiency.

The electrical strips (31) are designed to be connected to the power source (4). The power source can be the conventional electricity grid or a generator, or a photo-voltaic panel that utilizes solar energy to produce electricity that is then used to heat the water in the tank. The electrical connection mechanism (32) may include an electronic card and an electrical circuit designed to connect the electrical strips (31) to the power source and control the relevant power source so that it may be turned on at any given moment according to need.

Connecting the system (1) to relevant water and power sources: The tank (2), and in fact the water bag (22), has a water inlet hose (51) to which a water inlet pipe is connected. The water outlet hose (52) through which the water flows to a pipe to its relevant destination.

The system (1) may be used for supplying hot drinking water, possibly in outdoor events, hot water for showers and the like. The system (1) can be incorporated to an existing solar heater or to existing solar collectors that are already installed in the site. The system (1) with its water flexible tank (2) can serve as an alternative for existing solar heaters. This offers many advantages: (a) The system (1) and the water tank (2) are lightweight and small in terms of volume and can be transported and set up in the relevant location easily and safely, as opposed to rigid tanks; (b) scale does not likely to accumulate on the flexible tank (2) since the electrical heating strips do not come in direct contact with water and since there is no contact between the water and a metallic heating system the water are kept in drinking quality and may be used during shortage and crisis situation. If, nevertheless, scale accumulate on the water bag (22) it is possible to replace it easily and inexpensively.

The system (1) may be used for preventing the freezing of water in main water pipes. In cold places where external water tanks are used for the supply of water, systems are required in order to prevent water from freezing when ambient temperatures drop beneath the freezing point. In addition, in such areas as described above, even when water is supplied via standard water piping, there are times when it is so cold that water freezes in the pipes. The system offers an effective solution to this problem by connecting the system to the water and power systems, activating the heating carpet (3), and circulating warm water through the piping to prevent freezing.

The system (1) can be transported, set up, and connected in an easy and fast manner at the intended site. The system (1) is portable and can be transported from place to place according to need, or can be set up in one location for extended use. No similar water supply and heating system currently exists that offer the advantages and solutions mentioned above. The system (1) constitutes a good, efficient, and inexpensive response to the needs described in the application.

Figure 2:
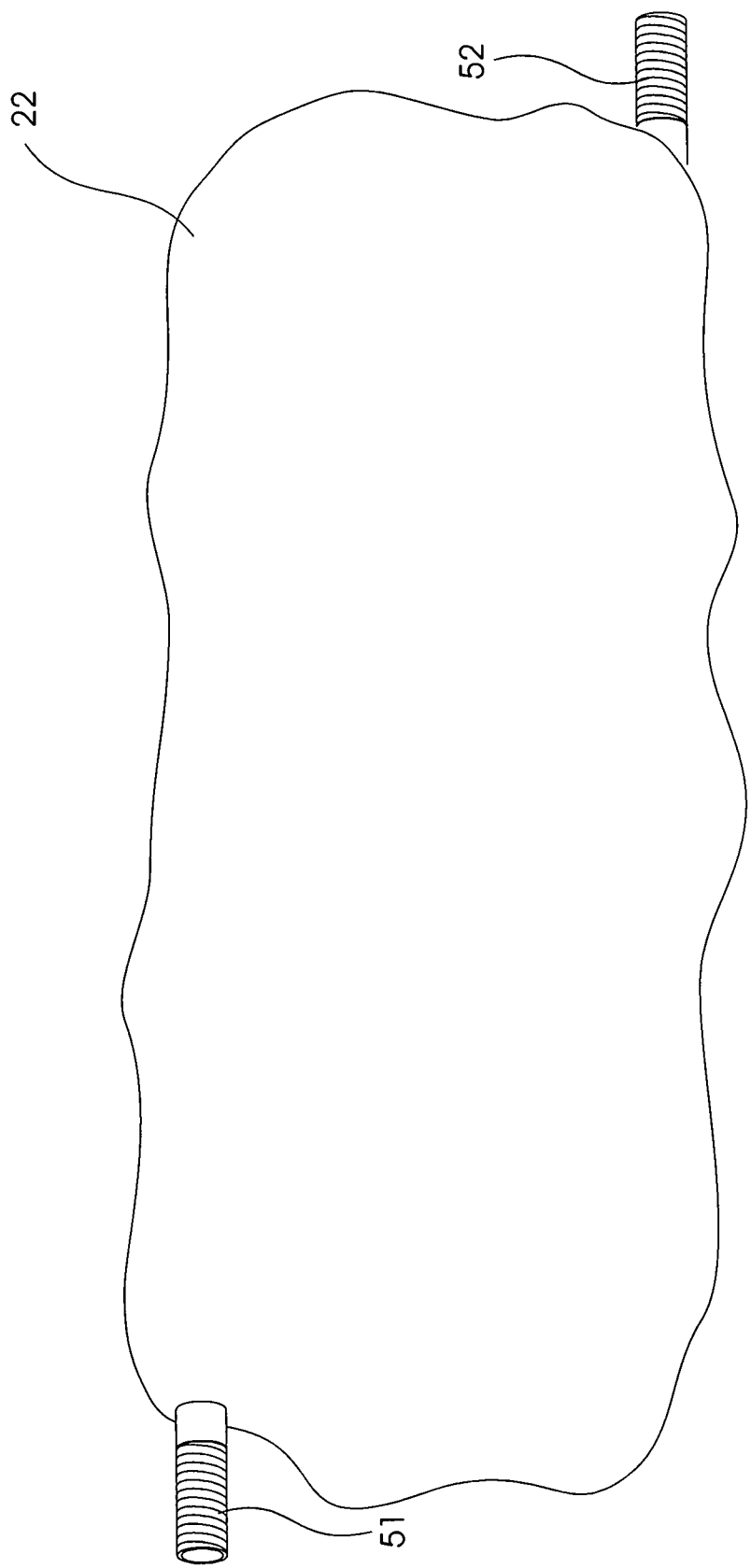
FIG. 2 presents schematically the water bag (22) and its water inlet hose (51).
Figure 3:
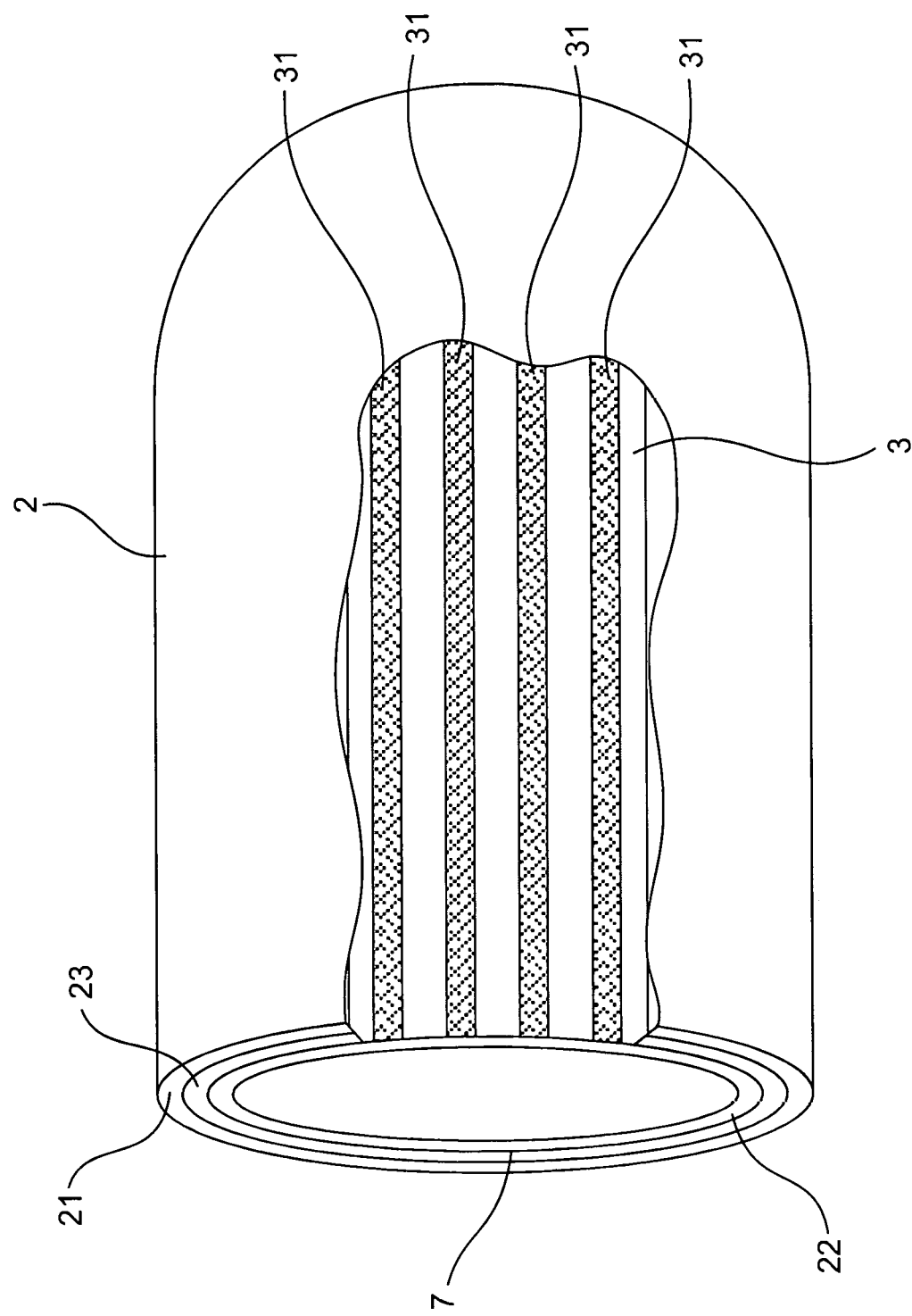
FIG. 3 presents schematically the flexible water tank (2) with the flexible heating carpet (3).
Figure 4:
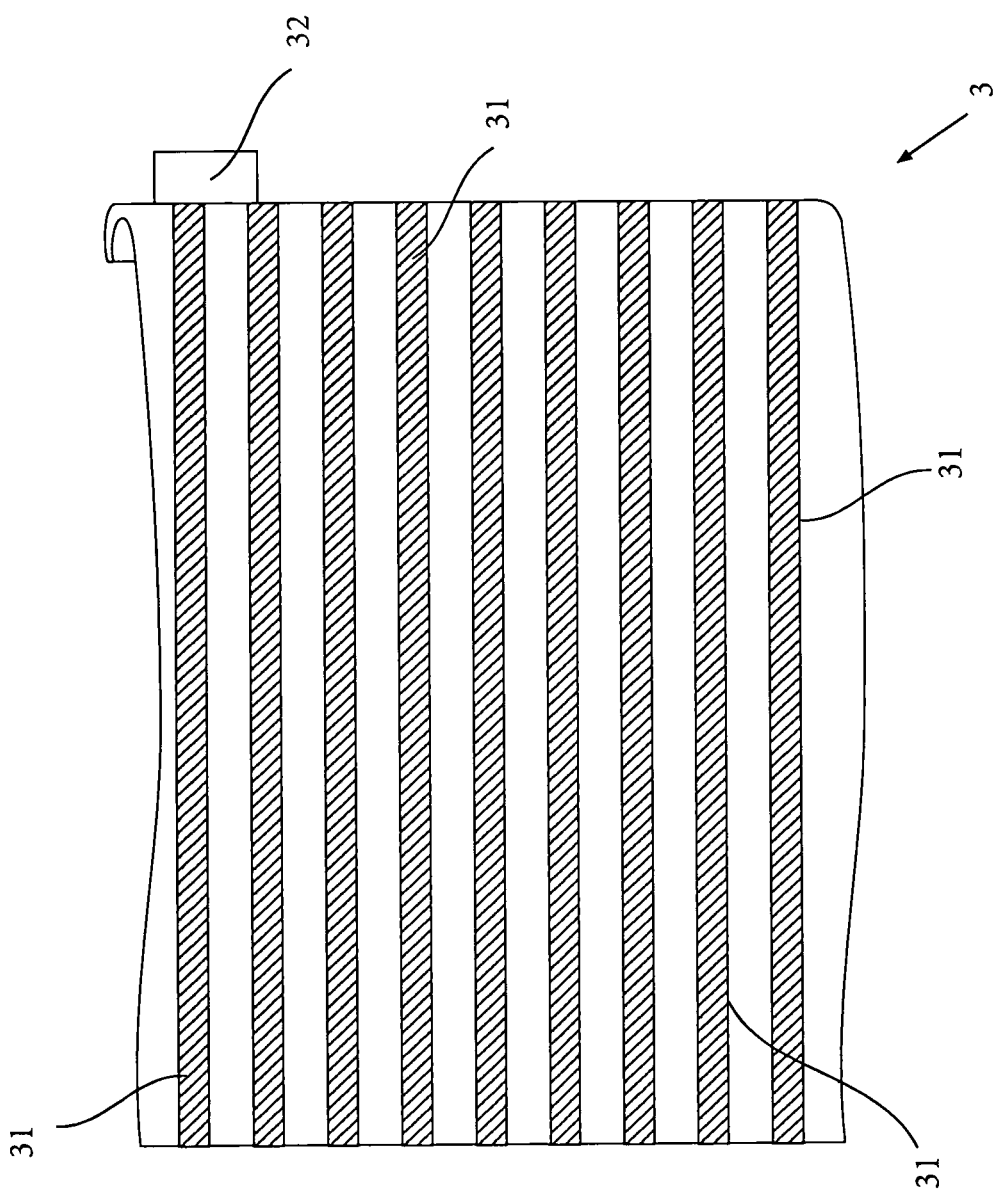
FIG. 4 presents schematically the flexible heating carpet (3) with the flexible electrical heating strips (31).

FIG. 1 presents schematically the system (1), the flexible water tank (2), the water inlet hose (51), the water outlet hose (52), the electrical connection mechanism (32), the controller (33) and a power supply (4). FIG. 2 presents schematically the water bag (22) and its water inlet hose (51). FIG. 3 presents schematically the flexible water tank (2) with the flexible heating carpet (3). FIG. 4 presents schematically the flexible heating carpet (3) with the flexible electrical heating strips (31).

What is claimed is:

1. A water supply and heating system, comprising: a flexible water tank, a flexible heating carpet and an electrical connection mechanism;

wherein said flexible water tank comprises a flexible outer layer and separable inflatable and collapsible water bag;

wherein said separable inflatable and collapsible water bag is equipped with a water inlet hose and a water outlet hose; wherein said separable inflatable and collapsible water bag is designed to receive water through the water inlet hose and to supply water through the water outlet hose;

wherein said separable inflatable and collapsible water bag is positioned inside the flexible outer layer and is designed to remain collapsed when empty;

wherein said water inlet hose and said water outlet hose are accessible through an opening in said flexible outer layer; wherein said separable inflatable and collapsible water bag can be replaced by a new one;

wherein said separable inflatable and collapsible water bag is designed to inflate when filled with water while positioned in said flexible outer layer and to deflate when the water is drained from said separable inflatable and collapsible water bag; wherein said flexible outer layer is designed to inflate when said separable inflatable and collapsible water bag is filled with the water while positioned in said flexible outer layer and to deflate when the water is drained from said separable inflatable and collapsible water bag;

wherein a dry space is defined between said flexible outer layer and said separable inflatable and collapsible water bag; wherein said flexible heating carpet includes flexible flat electrical heating strips that are connected to the electrical connection mechanism; wherein said flexible heating carpet is positioned in the dry space between the flexible outer layer and the separable inflatable and collapsible water bag; wherein said electrical connection mechanism is designed to connect the flexible flat electrical heating strips to a power source.

* * * * *